United States Patent
Suzuki et al.

(10) Patent No.: US 9,725,010 B2
(45) Date of Patent: Aug. 8, 2017

(54) FUEL CELL VEHICLE

(71) Applicant: HONDA MOTOR CO., LTD., Tokyo (JP)

(72) Inventors: Akihiro Suzuki, Wako (JP); Mitsunori Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 112 days.

(21) Appl. No.: 14/836,960

(22) Filed: Aug. 27, 2015

(65) Prior Publication Data

US 2016/0059734 A1 Mar. 3, 2016

(30) Foreign Application Priority Data

Aug. 27, 2014 (JP) ................................ 2014-172697

(51) Int. Cl.
*H01M 8/04* (2016.01)
*B60L 11/18* (2006.01)
*F17C 13/02* (2006.01)
*H01M 8/04082* (2016.01)
*B60L 3/00* (2006.01)

(52) U.S. Cl.
CPC ......... B60L 11/1883 (2013.01); B60L 3/0053 (2013.01); F17C 13/023 (2013.01); H01M 8/04201 (2013.01); F17C 2201/056 (2013.01); F17C 2205/0394 (2013.01); F17C 2250/0491 (2013.01); F17C 2265/04 (2013.01); F17C 2270/0168 (2013.01); Y02E 60/321 (2013.01); Y02T 90/16 (2013.01); Y02T 90/34 (2013.01)

(58) Field of Classification Search
CPC ............ B60L 11/1883; H01M 8/04201; F17C 13/023; F17C 2201/056; F17C 2205/0394; F17C 2250/0491; F17C 2265/04; F17C 2270/0168
See application file for complete search history.

(56) References Cited

U.S. PATENT DOCUMENTS 5,701,928 A * 12/1997 Aoki ................ B60K 15/03006
123/516
2010/0206427 A1* 8/2010 Iida ........................ B60K 15/04
141/94

FOREIGN PATENT DOCUMENTS

| JP | 07-195948 | 8/1995 |
|----|-----------|--------|
| JP | 2002-240746 | 8/2002 |

(Continued)

OTHER PUBLICATIONS

Japanese Office Action for corresponding JP Application No. 2014-172697, Nov. 22, 2016 (w/ English machine translation).

*Primary Examiner* — Muhammad Siddiquee
(74) *Attorney, Agent, or Firm* — Mori & Ward, LLP

(57) ABSTRACT

A fuel cell vehicle includes a fuel cell, a fuel storage container, a container installation space, a fill lid box, and a fuel gas detector. The fuel cell is to generate power through an electrochemical reaction between a fuel gas and an oxidant gas. At least part of the fuel storage container is disposed in the container installation space. The fill lid box includes a gas fill port inside the fill lid box and has a communication hole to connect an inside of the fill lid box with the container installation space. The fuel gas is to be supplied through the gas fill port into the fuel storage container from an outside of the fuel cell vehicle. The fuel gas detector is disposed inside the fill lid box to detect a fuel gas leakage and to detect a fuel gas density in the container installation space.

20 Claims, 5 Drawing Sheets

(56) References Cited

FOREIGN PATENT DOCUMENTS

| | | |
|---|---|---|
| JP | 2003-136976 | 5/2003 |
| JP | 2005-069361 | 3/2005 |
| JP | 2009-292190 | 12/2009 |
| JP | 2010-260436 | 11/2010 |

* cited by examiner

FUEL CELL VEHICLE

CROSS-REFERENCE TO RELATED APPLICATIONS

The present application claims priority under 35 U.S.C. §119 to Japanese Patent Application No. 2014-172697, filed Aug. 27, 2014, entitled "Fuel Cell Vehicle." The contents of this application are incorporated herein by reference in their entirety.

BACKGROUND

1. Field

The present disclosure relates to a fuel cell vehicle.

2. Description of the Related Art

Typical solid polymer electrolyte fuel cells include a solid polymer electrolyte membrane made of a polymer ion exchange membrane. Each fuel cell has an electrolyte-membrane electrode assembly (MEA) in which an anode electrode is disposed on one side of the solid polymer electrolyte membrane and a cathode electrode is disposed on the other side of the solid polymer electrolyte membrane. The anode electrode and the cathode electrode each include a catalyst layer (electrode catalyst layer) and a gas diffusion layer (porous carbon).

The electrolyte-membrane electrode assembly is tightly held by separators (bipolar plates) to form a fuel cell. A predetermined number of such fuel cells are stacked one on top of another to be used as a vehicle-mounted fuel cell stack, which is mounted on a fuel cell vehicle.

In a fuel cell vehicle, a fuel gas tank (hydrogen tank) is disposed in, for example, a rear portion of the vehicle (on the trunk lid or under the floor). This disposition is determined in consideration of various kinds of contraption to detect a gas leakage from the fuel gas tank.

For example, a fuel cell vehicle disclosed in Japanese Unexamined Patent Application Publication No. 2009-292190 includes a fuel cell system disposed under the vehicle floor, a fuel cell controlling device, a hydrogen sensor, and a breaking device. The hydrogen sensor detects a hydrogen leakage and the breaking device cuts off a hydrogen gas fed from a hydrogen tank. The fuel cell system includes fuel cells, a hydrogen tank, a hydrogen supply pipe through which a hydrogen gas is fed from the hydrogen tank to the fuel cells, and a hydrogen ejection pipe through which a hydrogen exhaust gas exhausted from the fuel cells is ejected.

A vehicle controlling device that controls the vehicle and that is connected to the fuel cell controlling device using a first connection cable is disposed on the vehicle floor. A through hole through which the first connection cable is routed is formed in the vehicle floor. The through hole is located at a position away from a hydrogen gas flow area over which a hydrogen leakage can occur.

In this manner, no through hole is formed in a portion of the floor surface located above an area between the fuel cells and the hydrogen tank, over which a hydrogen leakage can occur. Thus, the fuel cell vehicle is described as being capable of preventing a hydrogen gas from entering into the vehicle interior above the floor in case of an occurrence of a hydrogen leakage.

SUMMARY

According to one aspect of the present invention, a fuel cell vehicle includes a fuel cell, a fuel storage container, a fill lid box, and a fuel gas detector. The fuel cell generates power through an electrochemical reaction with a fuel gas and an oxidant gas. The fuel storage container stores the fuel gas. At least part of the fuel storage container is disposed in a container installation space. A gas fill port that allows the fuel gas to be inserted therethrough into the fuel storage container from outside the vehicle is disposed in the fill lid box. The fill lid box has a communication hole that connects an inside of the fill lid box with the container installation space. The fuel gas detector is disposed inside the fill lid box and detects a fuel gas leakage. A fuel gas density in the container installation space is detectable by the fuel gas detector.

According to another aspect of the present invention, a fuel cell vehicle includes a fuel cell, a fuel storage container, a container installation space, a fill lid box, and a fuel gas detector. The fuel cell is to generate power through an electrochemical reaction between a fuel gas and an oxidant gas. The fuel storage container is to store the fuel gas. At least part of the fuel storage container is disposed in the container installation space. The fill lid box includes a gas fill port inside the fill lid box and has a communication hole to connect an inside of the fill lid box with the container installation space. The fuel gas is to be supplied through the gas fill port into the fuel storage container from an outside of the fuel cell vehicle. The fuel gas detector is disposed inside the fill lid box to detect a fuel gas leakage and to detect a fuel gas density in the container installation space.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
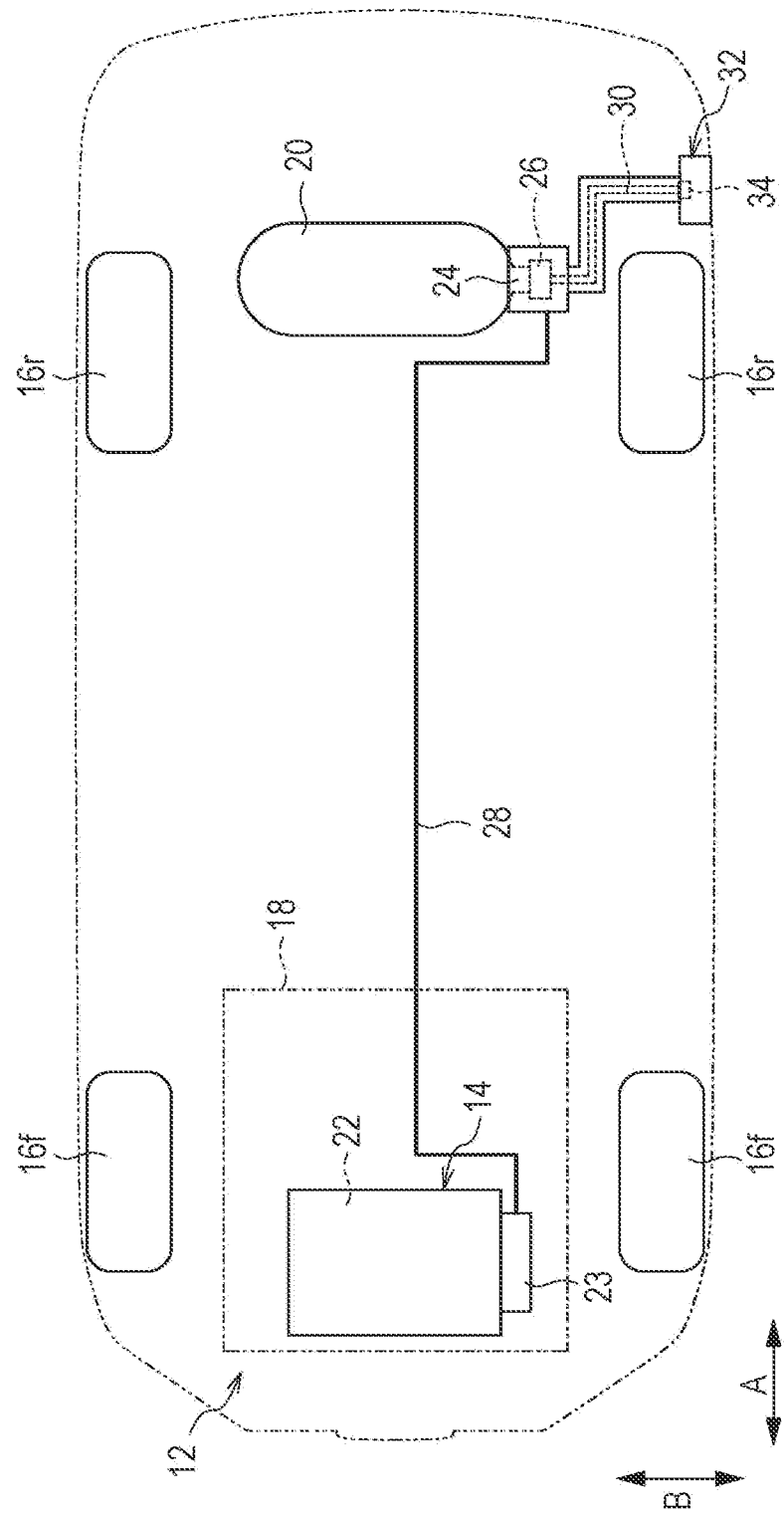
FIG. 1 schematically illustrates a rough general configuration of a fuel cell vehicle according to a first embodiment of the disclosure.

The embodiments will now be described with reference to the accompanying drawings, wherein like reference numerals designate corresponding or identical elements throughout the various drawings.

As illustrated in FIG. 1, a fuel cell vehicle 10 according to a first embodiment of the disclosure is, for example, a fuel cell electric vehicle including a fuel cell system 12. In the fuel cell system 12, a fuel cell stack 14 is disposed in a motor room 18 near front wheels 16f and a hydrogen tank (fuel storage container) 20 is disposed between rear wheels 16r.

The fuel cell stack 14 includes multiple fuel cells 22 stacked one on top of another in the horizontal direction (direction of arrow B) or in the gravitational direction. Although not illustrated, each fuel cell 22 includes, for example, an electrolyte-membrane electrode assembly tightly held by a pair of separators. The electrolyte-membrane electrode assembly includes a cathode electrode and an anode electrode disposed on respective surfaces of the solid polymer electrolyte membrane. The cathode electrode is supplied with an oxidant gas (for example, air), whereas the anode electrode is supplied with a fuel gas (for example, a hydrogen gas). The fuel cell 22 generates power through an electrochemical reaction with the oxidant gas and the fuel gas.

The fuel cell stack 14 is connected with a fuel gas supply device 23, which supplies a fuel gas, an oxidant gas supply device (not illustrated), which supplies an oxidant gas, and a coolant supply device (not illustrated), which supplies a coolant.

Figure 2:
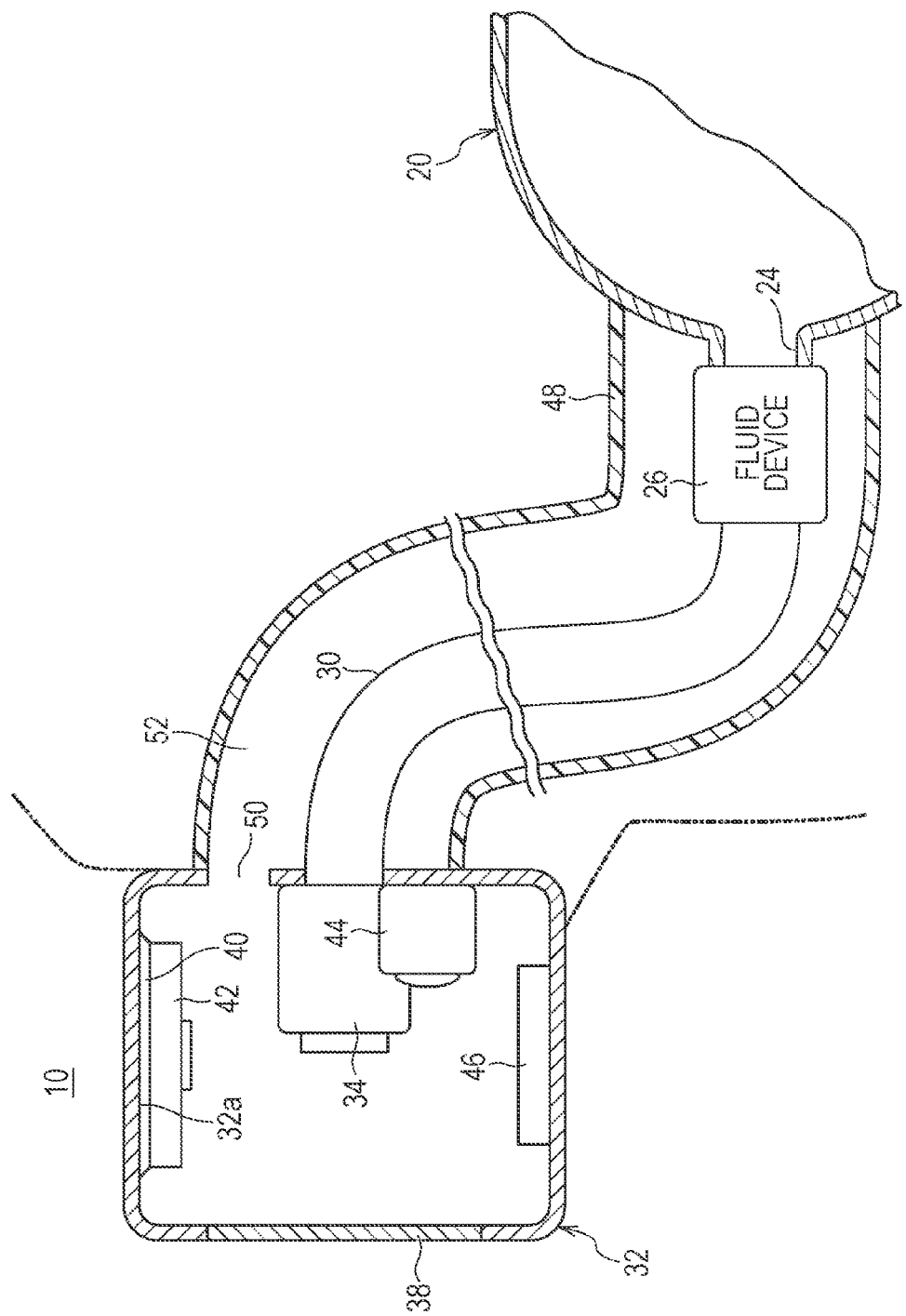
FIG. 2 illustrates a main portion of the fuel cell vehicle.

As illustrated in FIG. 1 and FIG. 2, the entire hydrogen tank 20 is formed as an integrated body. The hydrogen tank 20 stores high-pressure hydrogen. The hydrogen tank 20 has a hydrogen flow port (serves as a fuel gas inlet port and a fuel gas outlet port) 24 at only one end portion. A fluid device 26 is connected to the hydrogen flow port 24. The fluid device 26 includes joints and valves including an open-close valve. One end of a hydrogen supply pipe 28 is connected to the fluid device 26 using, for example, joints. The other end of the hydrogen supply pipe 28 is connected to the fuel gas supply device 23 (see FIG. 1).

Figure 3:
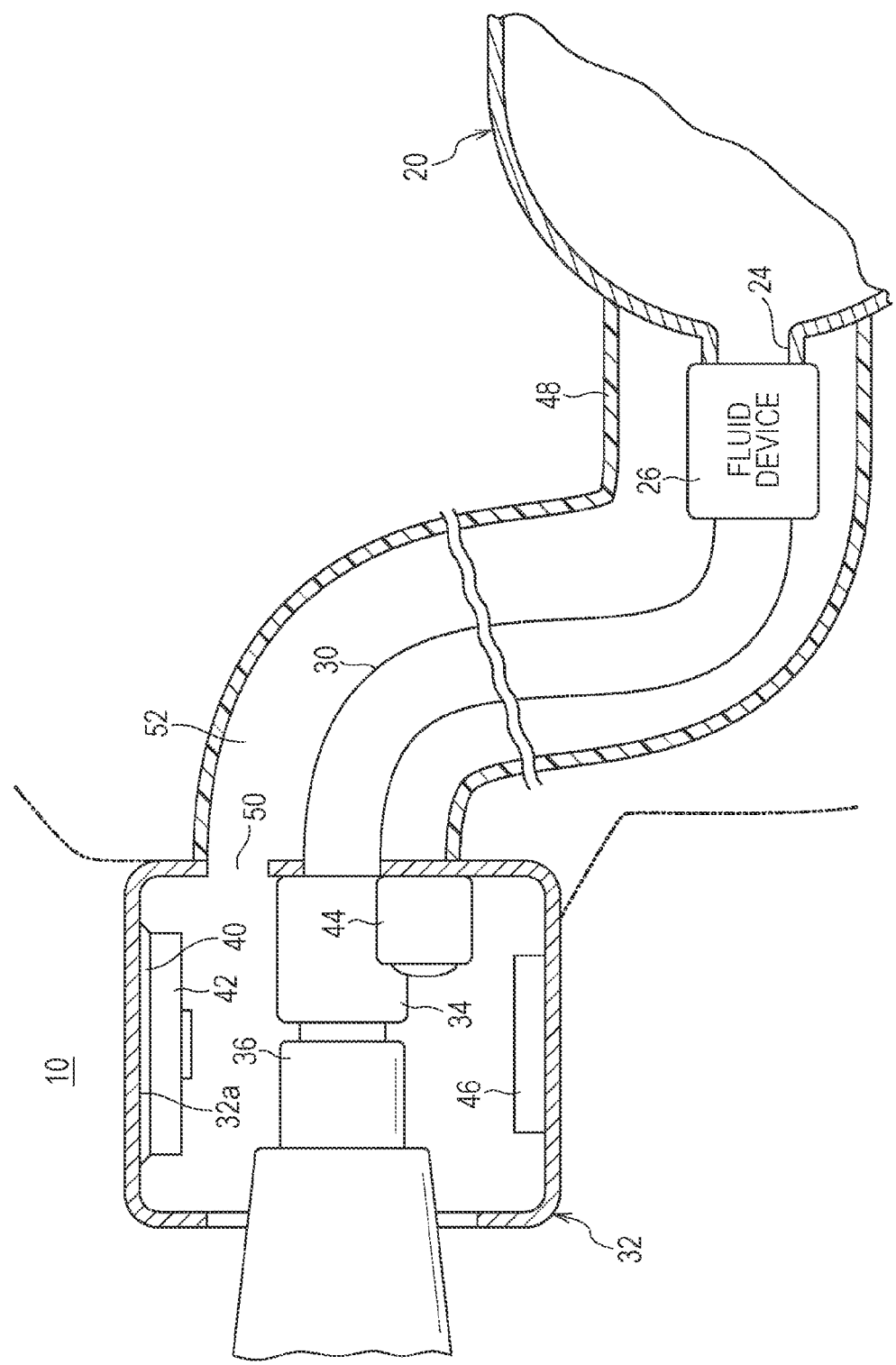
FIG. 3 illustrates the main portion of FIG. 2 to which a fill plug is connected.

One end of a hydrogen fill pipe 30 is connected to the fluid device 26 with an open-close valve interposed therebetween. The other end of the hydrogen fill pipe 30 extends toward one side of the fuel cell vehicle 10 in a vehicle width direction (direction of arrow B), for example, to the left at the rear, and is connected to a gas fill port 34, which is an external connection port disposed in the fill lid box 32. For filling of a fuel gas in the hydrogen tank 20 from outside the fuel cell vehicle 10, a fill plug 36 is connected to the gas fill port 34, as illustrated in FIG. 3. The fill plug 36 is provided in a hydrogen supply station, not illustrated, and is manually operated (or automatically operated).

Figure 4:
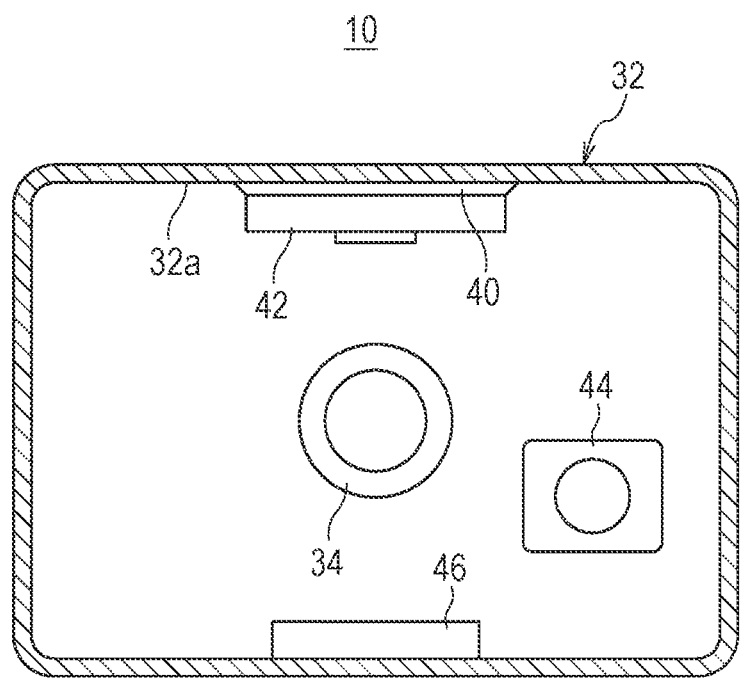
FIG. 4 is a front view of the main portion of FIG. 2.

As illustrated in FIG. 2, an openable lid member 38 is disposed at the end of the fill lid box 32. As illustrated in FIG. 2 to FIG. 4, a hydrogen sensor (fuel gas detector) 42 is disposed on a top board 32a in the fill lid box 32 with a bracket 40 interposed therebetween. The hydrogen sensor 42 detects a fuel gas leakage and selectively transmits a detection signal regarding the leakage to a communication controller (a communication fill ECU), not illustrated, or to a vehicle controller (a vehicle ECU), which controls the fuel cell system 12. The destination of a detection signal varies depending on, for example, the open/close state of the lid member 38; if the lid member 38 is open, the detection signal is transmitted to the communication controller, whereas if the lid member 38 is closed, the detection signal is transmitted to the vehicle controller. Whether a detection signal should be transmitted is determined in consideration of a density threshold. The density threshold that affects detection signal transmission may be determined uniformly throughout destinations or differently between destinations.

A communication fill infrared transmitter 44 is disposed in the fill lid box 32. The communication fill infrared transmitter 44 transmits a filling cancellation signal (abort) to a hydrogen supply station, not illustrated, upon receipt of a filling cancellation command from the communication controller due to a fuel gas leakage.

A state indicator 46 that allows users to visually perceive a cancellation of fuel gas filling is disposed in the fill lid box 32. The state indicator 46 includes, for example, a light emitting element such as a LED. In the state where fuel gas filling is permitted, the state indicator 46 illuminates, for example, green, whereas in the state where fuel gas filling is not permitted, the state indicator 46 illuminates, for example, red.

The hydrogen tank 20 and the fill lid box 32 are connected together by a duct member 48 made of a material such as resin or rubber and having a sealing function. One end of the duct member 48 is fixed to one end of the hydrogen tank 20 in such a manner that the duct member 48 surrounds the fluid device 26 so as to keep the fluid device 26 hermetically enclosed. The duct member 48 surrounds the hydrogen fill pipe 30 so as to keep the pipe 30 hermetically enclosed. The other end of the duct member 48 is connected to the fill lid box 32 while the communication hole 50 of the fill lid box 32 is kept hermetically enclosed.

An installation space (container installation space) 52 in which at least part of the hydrogen tank 20 and the fluid device 26 are disposed is defined in the duct member 48. The communication hole 50 connects the inside of the fill lid box 32 with the installation space 52. The installation space 52 extends obliquely upward from the hydrogen tank 20 toward the fill lid box 32 and connects with the communication hole 50 at the highest position of the installation space 52. The hydrogen sensor 42 is disposed at a position higher than the communication hole 50. The inside of the fill lid box 32 forms a closed space while the lid member 38 is shut.

The operation of the fuel cell vehicle 10 having the above-described structure is described as follows.

When the fuel cell vehicle 10 is in operation, the fuel gas supply device 23 supplies a hydrogen gas from the hydrogen tank 20 to the fuel cell stack 14 through the hydrogen supply pipe 28 as illustrated in FIG. 1. An oxidant gas supply device supplies an oxidant gas (air) to the fuel cell stack 14 using a device such as a blower, not illustrated. A coolant supply device supplies a coolant to the fuel cell stack 14 using a device such as a pump, not illustrated.

Thus, in each fuel cell 22, a fuel gas is fed to the anode electrode, whereas an oxidant gas is fed to the cathode electrode. In the electrolyte-membrane electrode assembly, the hydrogen gas fed to the anode electrode and the air fed to the cathode electrode are consumed during an electrochemical reaction inside the electrode catalyst layer and thus power is generated. Power is thus supplied to a driving motor (not illustrated), thereby enabling driving of the fuel cell vehicle 10.

For fuel gas filling in the hydrogen tank 20, the lid member 38 is opened in the hydrogen supply station, as illustrated in FIG. 3. Then, in a state where the fill plug 36 is being connected with the gas fill port 34, a fuel gas is fed to the gas fill port 34 at a desired flow rate adjusted in accordance with a control signal transmitted from a communication fill infrared transmitter 44. Thus, a fuel gas fills the hydrogen tank 20 through the hydrogen fill pipe 30, the fluid device 26, and the hydrogen flow port 24.

At the time of the above-described fuel gas filling, a fuel gas leakage is more likely to occur at, particularly, a junction between the gas fill port 34 and the fill plug 36. In the first embodiment, the gas fill port 34 is disposed inside the fill lid box 32 and the hydrogen sensor 42 is disposed above the gas fill port 34. Thus, the hydrogen sensor 42 reliably detects a fuel gas that moves upward after having typically leaked from the junction between the gas fill port 34 and the fill plug 36. The hydrogen sensor 42 is switched into a filling monitoring mode by a lid open signal in response to opening of the lid member 38.

When the hydrogen sensor 42 detects a fuel gas leakage in the filling monitoring mode, the hydrogen sensor 42 transmits a detection signal regarding the leakage to the communication controller. When the communication controller determines that the density of the leaked fuel gas reaches or exceeds a predetermined threshold, the communication controller transmits a filling cancellation signal (abort) to the hydrogen supply station using the communication fill infrared transmitter 44. Thus, fuel gas filling through the gas fill port 34 from the fill plug 36 is cancelled.

The communication controller causes the state indicator 46 to indicate a cancellation of fuel gas filling. The state indicator 46 illuminates, for example, green in the state where fuel gas filling is permitted, whereas the state indicator 46 illuminates, for example, red in the state where fuel gas filling is cancelled. Thus, users can visually perceive a cancellation of fuel gas filling easily and reliably.

As illustrated in FIG. 2, a tank outer wall of the hydrogen tank 20 is formed as an integrated unit. Thus, a fuel gas leakage can occur at only a junction between the hydrogen tank 20 and the fluid device 26, which is connected to the hydrogen tank 20.

In the first embodiment, one end of the duct member 48 is fixed to one end portion of the hydrogen tank 20 in such a manner that the duct member 48 surrounds the fluid device 26 so as to keep the fluid device 26 hermetically enclosed. The duct member 48 surrounds the hydrogen fill pipe 30 so as to keep the pipe 30 hermetically enclosed. The other end of the duct member 48 is connected to the fill lid box 32 so that the communication hole 50 of the fill lid box 32 is hermetically enclosed. The installation space 52 defined inside the duct member 48 connects with the inside of the fill lid box 32 through the communication hole 50.

Thus, a fuel gas leaked from a junction between the hydrogen tank 20 and the fluid device 26 moves obliquely upward along the installation space 52 of the duct member 48 and is then guided into the fill lid box 32 through the communication hole 50. Here, the inside of the fill lid box 32 forms a closed space while the lid member 38 is shut. Thus, the fuel gas rises up inside the fill lid box 32 and is detected by the hydrogen sensor 42. The hydrogen sensor 42 can thus efficiently and reliably detect an occurrence of a fuel gas leakage in the installation space 52.

In the first embodiment, the hydrogen sensor 42 is disposed inside the fill lid box 32. Thus, a single action of opening the lid member 38 enables easy access to the hydrogen sensor 42 from the outside. This disposition simplifies access to the hydrogen sensor 42 and improves the maintainability (workability during inspection and replacement) of the hydrogen sensor 42.

Figure 5:
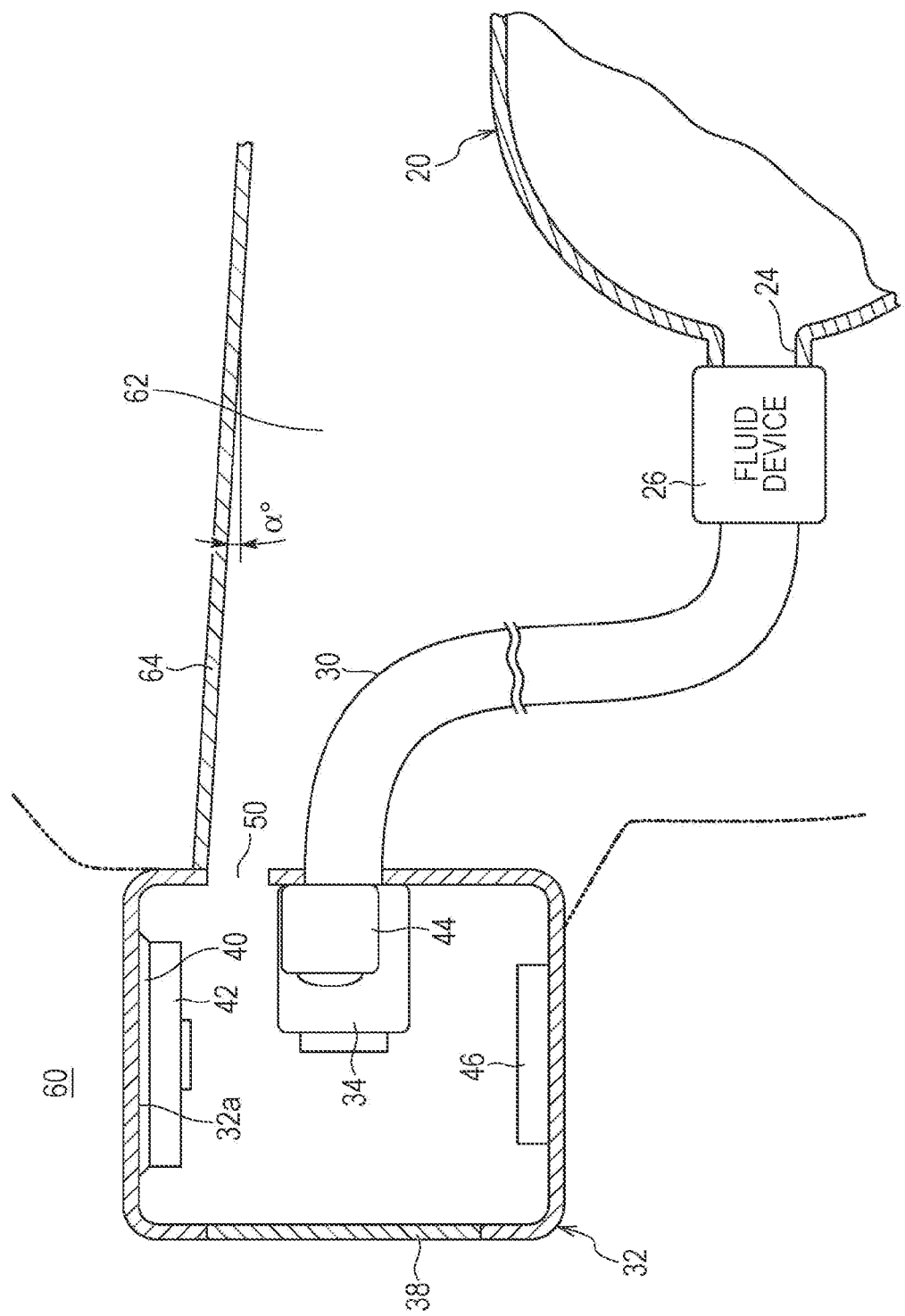
FIG. 5 illustrates a main portion of a fuel cell vehicle according to a second embodiment of the disclosure.

FIG. 5 illustrates a main portion of a fuel cell vehicle 60 according to a second embodiment of the disclosure. Components that are the same as those of the fuel cell vehicle 10 according to the first embodiment are denoted by the same reference numerals and not described in detail.

The fuel cell vehicle 60 includes an installation space (container installation space) 62, in which the hydrogen tank 20 is installed, and a floor panel 64, disposed above the hydrogen tank 20. The floor panel 64 extends obliquely upward by an angle α° toward the communication hole 50 of the fill lid box 32 from a position lower than the communication hole 50.

The position of the communication fill infrared transmitter 44 in the fill lid box 32 may be changed as necessary. For example, the center portion of the communication fill infrared transmitter 44 may be offset upward from the center portion of the gas fill port 34. Alternatively, as in the case of the first embodiment, the center portion of the communication fill infrared transmitter 44 may be offset downward from the center portion of the gas fill port 34.

In the above-described second embodiment, a fuel gas leaked from a junction between the hydrogen tank 20 and the fluid device 26 rises up inside the installation space 62 and is restricted by the floor panel 64. The floor panel 64 extends obliquely upward toward the communication hole 50.

Thus, the fuel gas is guided from an upper portion of the hydrogen tank 20 to the communication hole 50 along the slope of the floor panel 64, and then into the fill lid box 32 through the communication hole 50. The hydrogen sensor 42 is thus capable of reliably detecting an occurrence of a fuel gas leakage in the installation space 62 and has the same effects as those obtained in the case of the first embodiment.

A fuel cell vehicle according to an aspect of the disclosure includes a fuel cell, a fuel storage container, and a fill lid box. The fuel cell generates power through an electrochemical reaction with a fuel gas and an oxidant gas. The fuel storage container stores the fuel gas. In the fill lid box, a gas fill port is disposed and allows a fuel gas to be inserted therethrough into the fuel storage container from outside the vehicle.

The fuel cell vehicle includes a fuel gas detector, disposed inside the fill lid box and detecting a fuel gas leakage. At least part of the fuel storage container is disposed in a container installation space. In the fuel cell vehicle, the fill lid box has a communication hole that connects the inside of the fill lid box with the container installation space. The fuel gas density in the container installation space is detectable by the fuel gas detector.

The fuel cell vehicle preferably includes a fill pipe that connects a fuel gas inlet port of the fuel storage container with the gas fill port, an open-close valve disposed in the fuel gas inlet port, and a duct member that surrounds the fill pipe and the open-close valve so as to keep the fill pipe and the open-close valve hermetically enclosed. In the fuel cell vehicle, the duct member is preferably connected to the fill lid box so as to keep the communication hole hermetically enclosed.

The fuel cell vehicle preferably includes a floor panel disposed above the fuel storage container. In the fuel cell vehicle, preferably, the floor panel extends obliquely upward toward the communication hole from a position lower than the communication hole so as to guide a fuel gas located in an upper portion of the fuel storage container to the communication hole.

In the fuel cell vehicle, a state indicator that allows a cancellation of fuel gas filling to be visually perceived is preferably disposed inside the fill lid box.

In the fuel cell vehicle, the fuel gas detector preferably changes a destination of a detection signal in response to opening and closing of the fill lid box.

In the fuel cell vehicle according to the aspect of the disclosure, if a fuel gas leaks through a gas fill port while filling the fuel storage container, the fuel gas detector disposed inside the fill lid box detects the fuel gas leakage. If, on the other hand, a fuel gas leaks from the fuel storage container into the container installation space, the fuel gas flows into the fill lid box through the communication hole and is then detected by the fuel gas detector.

Thus, a fuel gas leakage can be easily and reliably detected. Particularly, the fuel gas detector disposed inside the fill lid box is made more easily accessible from the outside and is thus made more easily maintainable.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell vehicle, comprising:
    a fuel cell that generates power through an electrochemical reaction with a fuel gas and an oxidant gas;
    a fuel storage container that stores the fuel gas, at least part of the fuel storage container being disposed in a container installation space;
    a fill lid box in which a gas fill port that allows the fuel gas to be inserted therethrough into the fuel storage container from outside the vehicle is disposed, the fill lid box having a communication hole that connects an inside of the fill lid box with the container installation space; and
    a fuel gas detector that is disposed inside the fill lid box and that detects a fuel gas leakage,
    wherein a fuel gas density in the container installation space is detectable by the fuel gas detector, and
    wherein the fuel gas detector is mounted on an inside surface of the fill lid box.

2. The fuel cell vehicle according to claim 1, further comprising:
    a fill pipe that connects a fuel gas inlet port of the fuel storage container with the gas fill port;
    an open-close valve disposed in the fuel gas inlet port; and
    a duct member that surrounds the fill pipe and the open-close valve so as to keep the fill pipe and the open-close valve hermetically enclosed,
    wherein the duct member is connected to the fill lid box so as to keep the communication hole hermetically enclosed.

3. The fuel cell vehicle according to claim 1, further comprising:
    a floor panel disposed above the fuel storage container,
    wherein the floor panel extends obliquely upward toward the communication hole from a position lower than the communication hole so as to guide the fuel gas located in an upper portion of the fuel storage container to the communication hole.

4. The fuel cell vehicle according to claim 1, wherein a state indicator that allows a cancellation of fuel gas filling to be visually perceived is disposed inside the fill lid box.

5. The fuel cell vehicle according to claim 1, wherein the fuel gas detector changes a destination of a detection signal in response to opening and closing of the fill lid box.

6. A fuel cell vehicle comprising:
    a fuel cell to generate power through an electrochemical reaction between a fuel gas and an oxidant gas;
    a fuel storage container to store the fuel gas;
    a container installation space in which at least part of the fuel storage container is disposed;
    a fill lid box including a gas fill port inside the fill lid box and having a communication hole to connect an inside of the fill lid box with the container installation space, the fuel gas being to be supplied through the gas fill port into the fuel storage container from an outside of the fuel cell vehicle; and
    a fuel gas detector disposed inside the fill lid box to detect a fuel gas leakage and to detect a fuel gas density in the container installation space,
    wherein the fuel gas detector is mounted on an inside surface of the fill lid box.

7. The fuel cell vehicle according to claim 6, further comprising:
    a fill pipe connecting a fuel gas inlet port of the fuel storage container with the gas fill port;
    an open-close valve disposed in the fuel gas inlet port; and
    a duct member surrounding the fill pipe and the open-close valve so as to keep the fill pipe and the open-close valve hermetically enclosed,
    wherein the duct member is connected to the fill lid box so as to keep the communication hole hermetically enclosed.

8. The fuel cell vehicle according to claim 6, further comprising:
    a floor panel disposed above the fuel storage container,
    wherein the floor panel extends obliquely upward toward the communication hole from a position lower than the communication hole so as to guide the fuel gas located in an upper portion of the fuel storage container to the communication hole.

9. The fuel cell vehicle according to claim 6,
    wherein a state indicator that allows a cancellation of fuel gas filling to be visually perceived is disposed inside the fill lid box.

10. The fuel cell vehicle according to claim 6,
    wherein the fuel gas detector changes a destination of a detection signal in response to opening and closing of the fill lid box.

11. The fuel cell vehicle according to claim 6,
    wherein the container installation space is connected to the communication hole at a highest position of the container installation space.

12. The fuel cell vehicle according to claim 6,
    wherein the fuel gas detector is provided at a position higher than the communication hole.

13. The fuel cell vehicle according to claim 7,
    wherein one end of the duct member is connected to the fuel storage container and another end of the duct member is connected to the fill lid box.

14. The fuel cell vehicle according to claim 1, further comprising:
    a fill pipe that connects a fuel gas inlet port of the fuel storage container with the gas fill port; and
    a duct member that surrounds the fill pipe and defines the container installation space,
    wherein the duct member is connected to the fill lid box and the fuel storage container.

15. The fuel cell vehicle according to claim 14,
    wherein the duct member is directly connected to the fill lid box and the fuel storage container.

16. The fuel cell vehicle according to claim 15,
    wherein the fill lid box is provided above the fuel storage container,
    wherein the duct member is directly connected to the fill lid box so as to surround the communication hole, and
    wherein the communication hole is provided at a highest position within the duct member.

17. The fuel cell vehicle according to claim 1,
    wherein the fuel gas detector is provided in a position higher than the communication hole.

18. The fuel cell vehicle according to claim 6, further comprising:
    a fill pipe that connects a fuel gas inlet port of the fuel storage container with the gas fill port; and
    a duct member that surrounds the fill pipe and defines the container installation space,
    wherein the duct member is connected to the fill lid box and the fuel storage container.

19. The fuel cell vehicle according to claim 18,
    wherein the duct member is directly connected to the fill lid box and the fuel storage container.

20. The fuel cell vehicle according to claim 19,
wherein the fill lid box is provided above the fuel storage container,
wherein the duct member is directly connected to the fill lid box so as to surround the communication hole, and
wherein the communication hole is provided at a highest position within the duct member.

\* \* \* \* \*